United States Patent
Wyman

(10) Patent No.: US 6,509,074 B1
(45) Date of Patent: *Jan. 21, 2003

(54) PRESSURE SENSITIVE RELEASABLE LATEX DIPPED FELT UNDERLAY

(76) Inventor: Oliver Wyman, 817 N. Hamilton St., Dalton, GA (US) 30720

( * ) Notice: Subject to any disclaimer, the term of this patent is extended or adjusted under 35 U.S.C. 154(b) by 0 days.

This patent is subject to a terminal disclaimer.

(21) Appl. No.: 09/373,634

(22) Filed: Aug. 13, 1999

(51) Int. Cl.[7] .............................................. B32B 33/00
(52) U.S. Cl. ...................... 428/40.1; 28/107; 28/169; 428/41.5; 428/41.8; 428/95; 428/96; 428/97; 428/354; 428/355
(58) Field of Search ........................... 428/40.1, 41.5, 428/41.8, 95, 96, 97, 354, 355; 28/107, 169

(56) References Cited

U.S. PATENT DOCUMENTS

| | | | |
|---|---|---|---|
| 3,227,604 A | 1/1966 | Morgan | 161/162 |
| 3,442,731 A | 5/1969 | Anderson | 156/71 |
| 3,578,550 A | 5/1971 | Hoerner et al. | 161/162 |
| 3,586,598 A | 6/1971 | Beemer | 161/160 |
| 3,613,612 A | 10/1971 | Kennedy | 112/410 |
| 3,788,364 A | 1/1974 | Dawbarn | 139/420 R |
| 3,895,153 A | 7/1975 | Johnston et al. | 428/141 |
| 3,932,328 A | 1/1976 | Korpman | 428/355 |
| 3,982,051 A | 9/1976 | Taft et al. | 428/95 |
| 4,075,377 A | 2/1978 | Aitchison et al. | 428/95 |
| 4,151,319 A | 4/1979 | Sackoff et al. | 428/40.1 |
| 4,234,649 A | 11/1980 | Ward | 428/343 |
| 4,280,171 A | 7/1981 | Huang | 362/240 |
| 4,336,293 A | 6/1982 | Eiden | 428/143 |
| 4,374,884 A | 2/1983 | Kwok et al. | 428/95 |
| 4,405,668 A | 9/1983 | Wald | 428/40.1 |
| 4,482,595 A | 11/1984 | Fujishita et al. | 428/95 |
| 4,576,665 A | 3/1986 | Machell | 428/96 |
| 4,577,774 A | 3/1986 | Hoopengardner | 428/95 |
| 4,650,822 A | 3/1987 | Veazey et al. | 524/376 |
| 4,680,209 A | 7/1987 | Zybko et al. | 428/95 |
| 4,695,493 A | 9/1987 | Friedlander et al. | 428/95 |
| 4,696,849 A | 9/1987 | Mobley et al. | 428/95 |
| 4,743,330 A | 5/1988 | Tillotson | 428/95 |
| 4,797,170 A | 1/1989 | Hoopengardner | 428/40.1 |
| 4,820,746 A | 4/1989 | Rice et al. | 522/127 |
| 4,849,267 A | 7/1989 | Ward et al. | 428/95 |
| 4,957,798 A | 9/1990 | Bogdany | 428/95 |
| 5,082,705 A | 1/1992 | Rose | 428/40.1 |
| 5,084,317 A | 1/1992 | Epple | 428/95 |
| 5,116,439 A | 5/1992 | Raus | 428/43 |
| 5,120,587 A | 6/1992 | McDermott, III et al. | 428/40.1 |
| 5,160,770 A | 11/1992 | Hoopengardner | 428/40.1 |
| 5,217,552 A | 6/1993 | Miyajima et al. | 156/71 |
| 5,304,268 A | 4/1994 | Hoopengardner | 428/40.1 |

(List continued on next page.)

OTHER PUBLICATIONS

Rug–Hold Advertisement entitled "New Rug–Lock For Rugs on Carpet".
Rug–Hold Rug Underlays Brochure.
Rug–Hold Advertisement entitled "Multi–Grip Natural Rug Underlay".

*Primary Examiner*—Nasser Ahmad
(74) *Attorney, Agent, or Firm*—Edward J. Kondracki; Miles & Stockbridge P.C.

(57) ABSTRACT

A dimensionally stable rug underlay manufactured from needle-punched fibers arranged to form a non-woven felt fabric, to which an acrylic latex pressure sensitive adhesive is applied by a dipping process that coats the surfaces of the fibers and fills the interstices between the fibers. The acrylic adhesive is applied to the felt substrate in a dip and squeeze operation, which passes a felt web through a trough of adhesive and then through an excess adhesive removal station, after which, a protective releasable polymer film is applied to the exposed adhesive surfaces prior to curing step. The acrylic adhesive is selected to exhibit sufficient tackiness, while not leaving a residue after removal of the rug underlay from the underlying surface.

16 Claims, 2 Drawing Sheets

U.S. PATENT DOCUMENTS

| | | | |
|---|---|---|---|
| 5,382,462 A | 1/1995 | Pacione | 428/95 |
| 5,401,548 A | 3/1995 | Stepanek | 428/40.1 |
| 5,401,553 A | 3/1995 | Miwa et al. | 428/95 |
| 5,545,276 A | 8/1996 | Higgins | 156/79 |
| 5,565,511 A | 10/1996 | Braud et al. | 524/270 |
| 5,582,675 A | 12/1996 | Stepanek | 428/906 |
| 5,589,013 A | 12/1996 | Stepanek | 428/41.8 |
| 5,612,113 A | 3/1997 | Irwin, Sr. | 428/95 |
| 5,709,766 A | 1/1998 | Press et al. | 156/307.3 |
| 5,902,658 A * | 5/1999 | Wyman | 428/40.1 |

* cited by examiner

PRESSURE SENSITIVE RELEASABLE LATEX DIPPED FELT UNDERLAY

FIELD OF THE INVENTION

The present invention relates to rug underlays and more particularly to an underlay for releasably adhering a carpet to a floor surface.

DESCRIPTION OF RELATED ART

Rugs are frequently used to enhance the appearance of rooms by placing them at selected locations. In such situations, it is desirable to provide an underlay beneath the underside of the rug to prevent the rug from slipping. Such underlays may take many forms, such as an open mesh, and have a variety of degrees of adhesion to, and releasability from, the surface on which the rug is placed. An additional factor is the ability of the underlay to release from the underlying surface, or from the underside of a rug, without leaving an appreciable amount of residue on the surface. The rug underlay product can be fabricated in various thicknesses, thus providing additional cushioning and shock absorbency, enhancing the luxurious feel of the rug underfoot.

When rugs are used on carpeted areas or stain-sensitive bare floors, different considerations come into play, particularly because of the possibility of staining the face yarns of the underlying carpet or delicate bare surface due to spills. This is particularly important with rugs dyed with vegetable dyes. Colorations made with vegetable dyes are prone to run when wet. Thus, open mesh underlays do not satisfy the condition of protecting against staining by preventing spills and moisture from reaching the underlying carpet. Further, because of the texture of the pile surface of carpet, an open mesh underlay does not necessarily provide adequate gripping power to keep the rug from shifting on the carpet. Further, some of the resilience and cushioning effect is lost when the pile yarn extends through the open areas in the underlay.

For many years, a particular popular underlay for rugs placed on carpets has been available under the name RUG LOCK® sold by Rug Hold, Inc., of Dalton, Georgia. This RUG LOCK® product comprised a 4 to 5 ounce felt underlay, opposite sides of which have a releasable polypropylene film. In fabrication, the felt is saturated with an adhesive usually applied by spraying to provide a substrate which is tacky on both sides. The polymer film is applied to both sides, and to place the product on the carpet, the polymer films are removed. One side of the underlay is applied to the backside of the rug, while the other side is used to secure the rug to the carpet.

While this product has been the standard in the industry for many years, the product is subject to many disadvantages. For example, in application of the adhesive to the felt, the adhesive was sprayed on the felt. The application of the adhesive was difficult to control because the felt disguises the amount of adhesive applied. As a result, the felt could absorb too much adhesive, which would work excessively into the porous surfaces of the untreated felt pad. The adhesive could then transfer onto the pile surface of the carpet and between the fibers of the carpet. Further, if the adhesive transferred to the carpet, a high powered solvent had to be used to clean the adhesive from the underlying carpet. This could damage carpet coloration. Further, adhesive has a tendency to clog spray heads, making application thereof difficult and unnecessarily costly, due to product line interruption.

SUMMARY OF THE INVENTION

With the foregoing in mind, it is a primary object of the present invention to provide an improved pressure sensitive, releasable, rug underlay, which may be readily applied between the undersurface of a rug and an underlying surface, such as a carpet or a floor, such that the underlay can then be firmly, but releasably, adhered to both surfaces and which does not suffer the aforenoted disadvantages.

Another object of the present invention is to provide an improved pressure sensitive, releasable, rug underlay which is releasable from the underlying surface, such as a carpet or a floor, such that no appreciable residue is transferred to the underlying surface.

Still another object of the present invention is to provide an improved pressure sensitive, releasable, rug underlay which can be readily applied to the underside of a rug, and which minimizes the possibility of staining the underlying surface, such as a carpet on which the rug is placed, due to liquid spills.

Another object of the present invention is to provide an improved pressure sensitive, releasable, rug underlay which can be washed in water without degradation.

A further object of the present invention is to provide an improved rug underlay with is water impervious. A further object of the present invention is to provide an improved rug underlay having both end-to-end and side-to-side effective gripping characteristics. Another object of the present invention is to provide a rug underlay that is effective in holding a light weight rug. Still another object of the invention is to provide an improved rug underlay having improved dimensional stability and which can be efficiently manufactured.

These objects and their attendant advantages are achieved in accordance with the present invention, where a rug underlay comprising a polypropylene felt substrate has a non-aggressive latex-acrylic adhesive coating applied thereto by a dipping method, which renders the substrate both water impervious, dimensionally stable and efficiently manufacturable.

In accordance with the invention, the underlying substrate of the underlay is manufactured from "needle-punched" polypropylene fibers arranged to form a non-woven felt fabric, to which an acrylic latex pressure sensitive adhesive is applied by a dipping process that coats the surfaces of the fibers and fills the interstices between the fibers. This renders the felt substrate water impervious. The acrylic adhesive is applied to the felt substrate in a dip and squeeze operation. The felt substrate is run through a trough of adhesive and then passed through an excess adhesive removal station, for example, squeegies, dams, or rollers which remove excessive adhesive from the felt into the trough. At least one release foil is applied to the adhesive coating prior to a curing stage.

In an alternative embodiment, a pre-coat dip and squeeze step is included prior to application of the pressure sensitive adhesive. The purpose of a pre-coat is to control the degree of absorption of the pressure sensitive adhesive into the felt. The pre-coat step is essentially the same as that followed in application of the pressure sensitive adhesive, with the pre-coat composition supplanting the adhesive. Following the application and fixing of the pre-coat, the pre-coated felt fabric is directed to the pressure sensitive adhesive dip and squeeze process.

Advantageously, the pressure sensitive adhesive is selected to prevent accidental delamination of the underlay from the rug, by ensuring sufficient adhesion to all surfaces, including the backing of the rig and the underlying carpet fibers, or alternatively the bare floor. Consequently, the rug and underlay will tend to remain affixed together, and also to the underlying floor or carpet surface while in use, and when it is desired to relocate the rug and underlay, both can be easily lifted in combination, or separately from each other, without leaving undesirable residue on the underlying surface. If it is desired to store the rug in combination with the underlay for later use, a release film may be applied to the exposed adhesive side of the underlay.

Advantageously, the underlay can be washed in water without damage, for example, in a commonly available washing machine. A further advantage resulting from washing is that tackiness of the pressure sensitive surface is renewed.

When installing the product, if done at the installation-site, the rug to which the product is to be applied is first placed face down. An underlay is chosen or trimmed to the size of the rug and after a layer of foil is removed, the adhesive side of the underlay is pressed against the pack of the rug. The rug is then placed over the carpet or floor at the exact location where it is to be installed. The rug is then folded back halfway upon itself, and half of the exposed release foil is peeled off to expose one-half of the adhesive face of the side which is to be applied to the underlying surface. The rug is thereafter folded back on the underlying surface and the process is repeated with the other half of the underlay. The other half of the release foil is removed and after the remainder of the release foil is removed, the folded portion of the underlay is then folded back on the carpet to allow the full coating to adhesively grip the fibers of the carpet or the surface of the floor.

As should be apparent, the rug underlay can be applied at a manufacturing location so that rugs ready for installation can be readily handled and shipped. The underlay is also intended for installation on a bare floor, for example, a wood or vinyl covered floor, by using a procedure substantially the same as previously described for installation on a carpet. For installation on a bare floor, the underlay can be applied to the back or underside of the rug, as previously described, or it can be applied directly to the bare floor, after which, the rug is positioned on, and pressed against, the underlay.

BRIEF DESCRIPTION OF THE DRAWINGS

The invention is illustrated in the accompanying drawings wherein like parts are identified with like characters throughout the center views and in which FIGS. 1 and 2 each show a schematic cross sectional view of the typical prior art carpet produced using a primary backing of the prior art.

DESCRIPTION OF THE PREFERRED EMBODIMENTS

Figure 1:
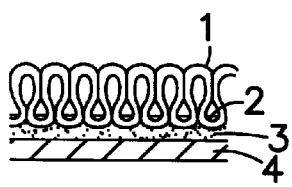
Figure 2:
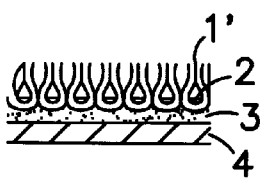

FIG. 1 shows a typical prior art carpet in fragmentary cross section including pile or face yarns 1 of the loop type, which are tufted into a primary backing 2 with the tufts locked in place by a suitable latex 3 to which is adhered a secondary back 4. FIG. 2 is similar to FIG. 1, except that face yarns 1' are of the cut type.

A carpet of the type shown in FIGS. 1 and 2 may generally vary in size and frequently is laid wall to wall. In order to enhance the overall appearance of the room, designers frequently intersperse the surface of the carpet or alternatively, a bare floor, with rugs according to the decor of the room.

Figure 3:
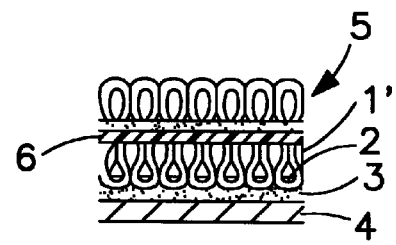
FIG. 3 shows a schematic cross sectional view of a rug applied to a carpet utilizing the underlay of the present invention.
Figure 4:
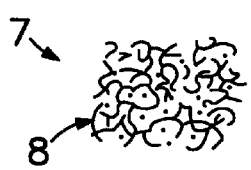
FIG. 4 shows a fragmentary plan view of the substrate felt fabric employed in the present invention.

As seen in FIG. 3, a woven rug 5 is shown placed on the cut pile face of yarns 1'. The underside of rug 5 includes an underlay 6 having a substrate 7, as shown in FIG. 4. The fabric of substrate 7 is a non-woven "needle punch" synthetic plastic felt, preferably polypropylene, such as, for example, the Amoco Duon product, style 4841, manufactured by Amoco fabrics & Fibers, Atlanta, Ga. Preferably the felt substrate 7 is a 4-ounce felt, although other weights are suitable.

The synthetic plastic used for the yarns of the substrate material include those comprised of any of the synthetic plastic materials capable of formation into non-woven felt fabric. Such plastics include, for example, polyethylene, polypropylene, ethylene/propylene co-polymers, numerous other polymers and co-polymers of other alpha-olefins, polyesters, polyimides, rayon, polyvinyl chloride and many other synthetic plastic materials. The invention is most especially applicable to those primary backings comprised of non-woven, needle-punched polypropylene fibers.

FIG. 4, in accordance with the present invention, shows the substrate 7 as including fibers 8, in the form of randomly oriented monofilaments of any desired cross section, which are crowded together to form a felt fabric having two substantially flat opposing surfaces with relatively small interstices formed between adjacent fibers.

Figure 5:
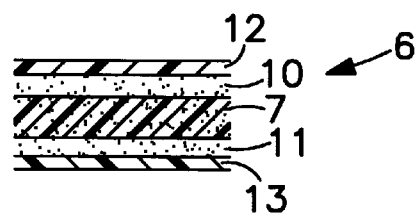
FIG. 5 shows a schematic cross sectional view of the underlay of the present invention.

FIG. 5, in accordance with the present invention, shows rug underlay 6 including substrate 7 having applied to each side thereof and throughout, a pressure sensitive non-aggressive latex acrylic adhesive 10 and 11 to which is applied a polymer release film 12 and 13, respectively. By non-aggressive, it is meant an adhesive that permits the rug to be readily lifted from the carpet or bare floor when desired. Pressure sensitive non-aggressive adhesive 10 and 11 preferably is an acrylic copolymer emulsion having a glass transition temperature between −30 and −46 degrees centigrade. In an alternative embodiment, the pressure sensitive adhesive is a composition including, by weight, 57.0–89.0% acrylate polymer dispersion, 10.0–42.0% calcium carbonate, and 0.25–1.0% ammonium polyacrylate.

Figure 6:
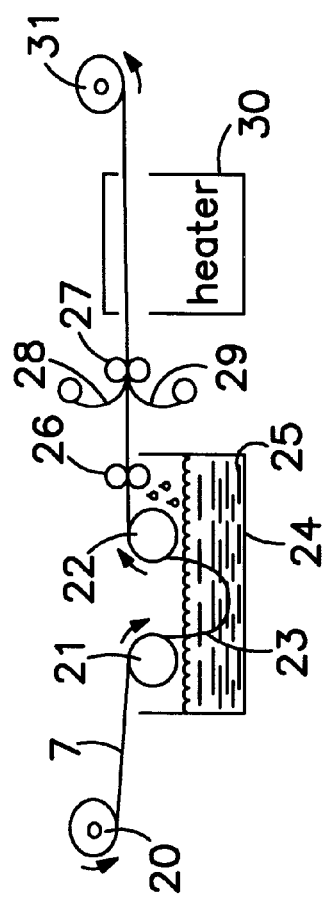
FIG. 6 illustrates the manner of applying the adhesive coating of the substrate of FIG. 5.

FIG. 6 shows the manner of fabricating the underlay of the present invention. To this end, a roll 20 of the non-woven needle-punched felt fabric web 7 is unwound and passed over drums 21, 22 to form a loop of the fabric 23 therebetween. A trough 24 contains a supply of pressure sensitive adhesive 25 in which the loop 21 extends below the level of the adhesive. The fabric web 7 is drawn through a pair of rollers 26 positioned over the supply trough 24, which causes excess adhesive to be squeezed out and returned to the trough 24, while simultaneously assuring that the adhesive penetrates and fills the interstices between the fibers. The fabric web 7 is passed through a pair of pinch rollers 27, which apply a release film 28 and 29 to respective opposing surfaces of the adhesive coated fabric web 7. Release films 28 and 29 comprise a thin plastic material and cover the pressure sensitive adhesive on both sides of fabric web 7. The pinch rollers 27 apply a slight pressure as the material is drawn through the rollers, thereby pressing the release films to the adhesive. The resultant product is drawn through a heater 30 for curing and then stored on a take-up roll 31.

Figure 7:
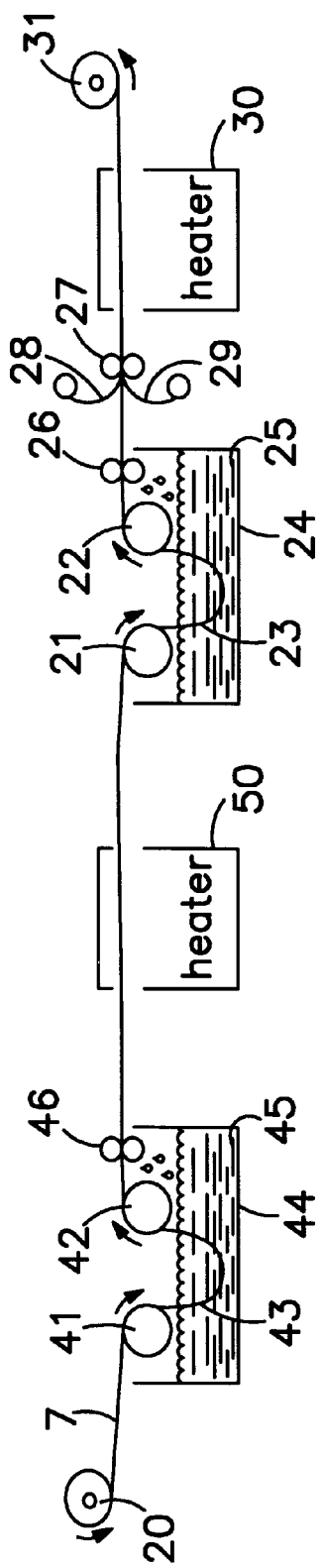
FIG. 7 illustrates the manner of applying a pre-coat before application of the adhesive coating of FIG. 6.

FIG. 7 shows the fabrication process of FIG. 6 modified to include application of a pre-coat to the felt web prior to the step in which the web is dipped into the adhesive. The pre-coat is a composition of, by weight, 55.0–88.0% styrene/butadiene polymer dispersion, 10.0–35.0% calcium carbonate, 2.0–10.0% starch and 0.25–1.0% sodium polyacrylate. In an alternative embodiment, the pre-coat is a composition of, by weight, 44.0–78.0% styrene/butadiene polymer dispersion, 20.0–45.0% calcium carbonate, 2.0–10.0% starch and 0.25–1.0% sodium polyacrylate.

FIG. 7 shows a second, duplicate arrangement of the dip and squeeze apparatus located upstream of the arrangement shown in FIG. 6. The roll 20 of the non-woven needle-punched felt fabric web 7 is unwound and passed over drums 41, 42 to form a loop of the fabric 43 therebetween. A trough 44 contains a supply of pre-coat 45 in which the loop 41 extends below the level of the pre-coat. The fabric web 7 is drawn through a pair of rollers 46 positioned over the supply trough 44, which causes excess pre-coat to be squeezed out and returned to the trough 44, while simultaneously assuring that the pre-coat penetrates and fills the interstices between the fibers. The resultant product is drawn through a heater 50 for curing and passed to roller 21 of the pressure sensitive adhesive dip and squeeze apparatus shown in FIG. 6. Optionally, the pre-coated fabric web 7 is stored on a take-up roll (not shown), interim storage, before subsequent application of adhesive.

In installation of the underlay to a rug prior to placement on a carpet, an underlay of a size corresponding to that of the rug is first selected. Any necessary trimming may be done prior to application of the underlay to the rug. The rug is placed face down in a location selected. One layer of the release film, for example, layer 12, is removed from the underlay, which is then applied to the back or underside of the rug. To adhere the underlay on the carpet, the rug is first placed face up on the carpet in the exact area in which the rug is to be displayed. Thereafter, the rug is folded back on itself halfway, and the exposed release foil cut along the fold line and peeled off to expose one half of the adhesive. The rug is then folded back to place the adhesive surface against the pile face of the carpet. The other half of the rug is then folded back on itself and the remainder of the polymer release film is peeled off, exposing the other half of the adhesive. The other half is then folded down onto the carpet sot that the entire adhesive coating of the underlay rests against and grips the pile surface causing the rug to be gripped firmly to the carpet surface. If desired, the release layer may include tear lines to facilitate separation of the film.

The underlay 7 is also intended for installation on a bare floor, for example, a wood or vinyl covered floor, using a procedure substantially the same as previously described for installation on a carpet. For installation on a bare floor, the underlay 7 can be applied to the back or underside of the rug, as previously described, or it can be applied directly to the bare floor, after which, the rug is positioned on, and pressed against, the underlay.

When the rug is initially installed, it easily can be peeled upwardly, away from the underlying carpet or bare floor, for accurate repositioning or relocation. Any well known pressure sensitive non-aggressive latex acrylic may be utilized. Preferably, the latex acrylic adhesive functions as a pressure sensitive adhesive and is selected and arranged to prevent or minimize leaving a residue on any surface to which the underlay has been adhered. In one embodiment, the pressure sensitive adhesive is a mixture by weight of 30% latex and 70% pressure sensitive adhesive. In a preferred embodiment, the pressure sensitive adhesive is an acrylic copolymer emulsion having a glass transition temperature between −30 and −46 degrees centigrade. In another preferred embodiment, the pressure sensitive adhesive is a composition including, by weight, 57.0–89.0% acrylate polymer dispersion, 10.0–421.0% calcium carbonate and 0.25–1.0% ammonium polyacrylate.

In still another embodiment, the underlay includes a pre-coat applied to the felt for controlling the absorption of pressure sensitive adhesive by the felt fabric, the pre-coat being a composition of, by weight, 55.0–88.0% styreneibutadiene polymer dispersion, 10.0–35.0% calcium carbonate, 2.0–10.0% starch and 0.25–1.0% sodium polyacrylate. In an alternative embodiment, the underlay includes a pre-coat applied to the felt, the pre-coat being a composition of, by weight, 44.0–78.0% styrene/butadiene polymer dispersion, 20.0–45.0% calcium carbonate, 2.0–10.0% starch and 0.25–1.0% sodium polyacrylate.

While this invention has been described in conjunction with specific embodiments thereof, it is evident that many alternative modifications and variations will be apparent to those skilled in the art. Accordingly, the preferred embodiments of the invention as set forth herein are intended to be illustrative, not limiting. Various changes may be made without departing from the true spirit and scope of the invention as defined herein and the following claims.

What is claimed is:

1. A pressure sensitive, releasable rug underlay comprising:

a nonwoven substrate formed of fibers;

first and second pressure sensitive non-aggressive adhesive coatings comprising a mixture by weight of 30% latex and 70% pressure sensitive non-aggressive adhesive disposed on opposite sides of said substrate, said pressure sensitive non-aggressive adhesive coatings being disposed on opposite surfaces of said substrate and filling interstices between said fibers throughout said substrate, said pressure sensitive non-aggressive adhesive adapted to releasably adhere a rug to an underlying surface without leaving an adhesive residue on said surface; and a peelable protective liner releasably secured to at least one of said coatings.

2. The rug underlay as set forth in claim 1 wherein said substrate is a 4 to 5 ounce felt fabric.

3. The rug underlay as set forth in claim 1 wherein said peelable protective liner is a polymer film.

4. The rug underlay as set forth in claim 1 wherein said pressure sensitive non-aggressive adhesive is an acrylic copolymer emulsion having a glass transition temperature between −30 and −46 degrees centigrade.

5. A pressure sensitive, dimensionally stable and releasable rug underlay comprising:

a nonwoven needle punched substrate formed of synthetic fibers;

first and second pressure sensitive non-aggressive adhesive coatings comprising a mixture by weight of 30% latex and 70% pressure sensitive non-aggressive adhesive disposed on opposite sides of said substrate, said pressure sensitive non-aggressive adhesive coatings being disposed on opposite surfaces of said substrate and filling interstices between said fibers throughout said substrate, said pressure sensitive non-aggressive adhesive adapted to releasably adhere a rug to an underlying surface without leaving an adhesive residue on said surface; and a peelable protective liner releasably secured to at least one of said coatings.

6. The rug underlay as set forth in claim 1 further comprising a pre-coat applied to said substrate, said pre-coat being a composition including, by weight, 55.0–88.0% styrene/butadiene polymer dispersion, 10.0–35.0% calcium carbonate, 2.0–10.0% starch, and 0.25–1.0% sodium polyacrylate.

7. The rug underlay as set forth in claim 1 further comprising a peelable protective liner releasably secured to each of said opposite sides of said substrate.

8. The rug underlay as set forth in claim 1 further comprising a pre-coat applied to said substrate, said pre-coat being a composition including, by weight, 44.0–78% styrene/butadiene polymer dispersion, 20.0–45.0% calcium carbonate, 2.0–10.0% starch and 0.25–1.0% sodium polyacrylate.

9. The rug underlay as set forth in claim 5 wherein said pressure sensitive non-aggressive adhesive is a composition including, by weight, 57.0–89.0% acrylate polymer dispersion, 10.0–42.0% calcium carbonate, and 0.25–1.0% ammonium polyacrylate.

10. The rug underlay as set forth in claim 5 wherein said substrate is a 4 to 5 ounce felt fabric.

11. The rug underlay as set forth in claim 5 wherein said fiber is polypropylene.

12. The rug underlay as set forth in claim 5 wherein said peelable protective liner is a polymer film.

13. The rug underlay as set forth in claim 5 wherein said pressure sensitive non-aggressive adhesive is an acrylic copolymer emulsion having a glass transition temperature between −30 and −46 degrees centigrade.

14. The rug underlay as set forth in claim 5 further comprising a pre-coat applied to said substrate, said pre-coat being a composition by weight of 55.0–88.0% styrene/butadiene polymer dispersion, 10.0–35.0% calcium carbonate, 2.0–10.0% starch, and 0.25–1.0% sodium polyacrylate.

15. The rug underlay as set forth in claim 5 further comprising a peelable protective liner releasably secured to each of said opposite sides of said substrate.

16. The rug underlay as set forth in claim 5 further comprising a pre-coat applied to said substrate, said pre-coat being a composition by weight of 44.0–78.0% styrene/butadiene polymer dispersion, 20.0–45.0% calcium carbonate, 2.0–10.0% starch, and 0.25–1.0% sodium polyacrylate.

* * * * *